(12) United States Patent  (10) Patent No.: US 10,185,964 B2
Cousins  (45) Date of Patent: Jan. 22, 2019

(54) UNIFICATION OF WEB PAGE REPORTING AND UPDATING THROUGH A PAGE TAG

(75) Inventor: Peter Cousins, Concord, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2349 days.

(21) Appl. No.: 12/756,677

(22) Filed: Apr. 8, 2010

(65) Prior Publication Data

US 2011/0153422 A1  Jun. 23, 2011

Related U.S. Application Data

(60) Provisional application No. 61/289,797, filed on Dec. 23, 2009.

(51) Int. Cl.
*G06Q 30/00* (2012.01)
*G06Q 30/02* (2012.01)
*G06F 17/00* (2006.01)

(52) U.S. Cl.
CPC .............. *G06Q 30/02* (2013.01); *G06F 17/00* (2013.01); *G06Q 30/0255* (2013.01)

(58) Field of Classification Search
USPC ............................................ 705/14; 715/205
See application file for complete search history.

(56) References Cited

U.S. PATENT DOCUMENTS 6,314,451 B1 * 11/2001 Landsman ............. G06Q 30/02
                                              709/202
2008/0183561 A1 * 7/2008 Zohar et al. .................. 705/10

* cited by examiner

*Primary Examiner* — Yehdega Retta
(74) *Attorney, Agent, or Firm* — Cuenot, Forsythe & Kim, LLC

(57) ABSTRACT

A computer-implemented method comprises receiving by one or more computers information indicative of a user's activity with one or more web pages, with the information being received based on an execution by a user's computer of a page tag inserted into the one or more web pages and with the information being associated with a unique identifier included in the page tag; and causing the one or more computers to send to the user's computer updated content of the one or more web pages associated with the unique identifier included in the page tag.

17 Claims, 7 Drawing Sheets

UNIFICATION OF WEB PAGE REPORTING AND UPDATING THROUGH A PAGE TAG

CLAIM OF PRIORITY

This application claims priority under 35 U.S.C. § 119(e) to provisional U.S. Patent Application 61/289,797, filed on Dec. 23, 2009, the entire contents of which are hereby incorporated by reference.

BACKGROUND

Promotions are specific communications made from one entity to another entity. The challenges in managing promotions can arise out of the various situations in which promotions are used. For example, marketers in the financial services, travel and retail industries may each have specialized considerations when communicating with potential or existing customers. Each industry has different types of promotions directed to communicate different types of products or services, resulting in an infinite variety of possible attributes. All marketers produce a potentially large variety of promotions and assign them to a potentially large variety of contacts. These promotions are logged and tracked for future analysis to improve effectiveness of the promotions.

SUMMARY

In one aspect of the present disclosure, a computer-implemented method comprises receiving by one or more computers information indicative of a user's activity with one or more web pages, with the information being received based on an execution by a user's computer of a page tag inserted into the one or more web pages and with the information being associated with a unique identifier included in the page tag; and causing the one or more computers to send to the user's computer updated content of the one or more web pages associated with the unique identifier included in the page tag.

In another aspect of the present disclosure, a computer program product resides on a computer readable storage medium and comprises instructions for causing a computer to: receive information indicative of a user's activity with one or more web pages, with the information being received based on an execution by a user's computer of a page tag inserted into the one or more web pages and with the information being associated with a unique identifier included in the page tag; and send to the user's computer updated content of the one or more web pages associated with the unique identifier included in the page tag.

In yet another aspect of the present disclosure, an apparatus comprises a processor; and a computer program product residing on a computer readable storage medium, the computer program product comprising instructions for causing the processor to: receive information indicative of a user's activity with one or more web pages, with the information being received based on an execution by a user's computer of a page tag inserted into the one or more web pages and with the information being associated with a unique identifier included in the page tag; and send to the user's computer updated content of the one or more web pages associated with the unique identifier included in the page tag.

Implementations of these aspects of the present disclosure can include one or more of the following features. One or more data repositories store the received information indicative of the user's activity with one or more web pages associated the unique identifier. The one or more web pages are associated with a marketing campaign. The unique identifier comprises one or more of an account identifier and a URL. The one or more web pages are two or more web pages and a same page tag is inserted into each of the two or more web pages. The one or more web pages are two or more web pages and the page tag inserted into each of the two or more web pages includes at least a same unique identifier. Information associated with content modifications for the one or more web pages is received and based on the received information instructions specifying how to modify the one or more web pages are generated. A request for updated content of the one more web pages associated with the unique identifier is received from the user's computer. The page tag comprises a virtual address of a file hosted on the one or more computers, with execution of the file by the user's computer causing the user's computer to generate a request for updated content of the one or more web pages.

One or more aspects of the present disclosure may provide one or more of the following advantages. Marketers and other business entities are able to update a web page in real-time without modifying the code of the web page or scheduling time with a technology department associated with the business entity to update the web page. Rather than updating the code (e.g., the HTML code) of a web page directly from within the web page, a marketer uses a web page editor to make modifications to the web page. The modifications are recorded by a server into an executable file (e.g., a JavaScript file). A page tag embedded in the web page causes a computing device displaying the web page to request the executable file including the modifications from the server, causes the computing device displaying the web page to download the executable file and causes the computing device to merge the contents of the executable file with the original contents of the web page, thereby updating the web page.

DETAILED DESCRIPTION

Figure 1:
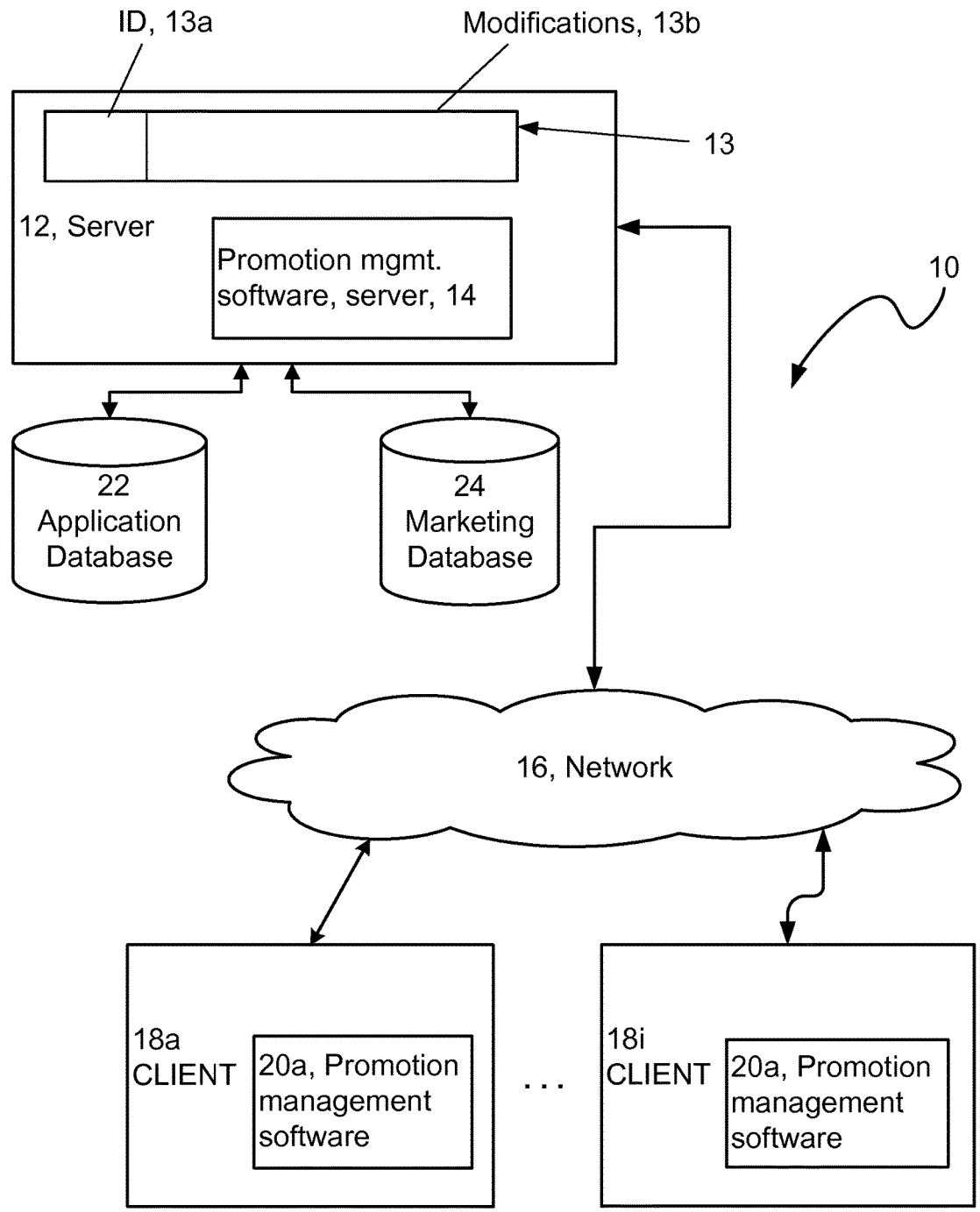
FIG. 1 is a block diagram of a computer system executing promotion management software.

Referring to FIG. 1, a network computer system 10 includes a server 12 executing software for promotion management 14, connected through a network 16, to client systems 18*a* to 18*i* executing respective client instances 20*a* to 20*i* of promotion management software 14. Although the network computer system 10 is shown including the server 12 running promotion management software server process 14 and client systems 18*a* to 18*i* running the client promotion management software 20*a* to 20*i*, it is understood that the server software 14 and the client promotion management software 20*a* to 20*i* can run on the same machines, e.g., the server 12. The client systems 18*a*-18*i* are used to interface with promotion management software instances 20*a* to 20*i* to produce and manage promotions. The server 12 is connected to an application database 22 that stores information required by the promotion management software 14 to operate (e.g., system table data) and a marketing database 24 that stores the company marketing (e.g., customer or prospect) and related data and can be used to drive marketing campaigns. The application and marketing databases 22 and 24 may run on the same machine as server 12 or on different machines. Databases 22 and 24 may be in different databases, on different machines, or they may be separate schemas in the same database on the same machine. The client systems 18a-18i are connected to the server 12 by the network 16. The server 12 includes a decision engine, which executes a series of rules to retrieve and send data to the client systems 18a-18i. Additionally, the decision engine may be configured in a cloud-based architecture in which applications and graphical user interfaces are delivered over the network 16 and are accessed by users of the system 10 from another web service or software (e.g., a web browser), while software, data and applications are stored on servers (including server 12 and other servers).

Using the system 10, marketers and other entities author, host, personalize, and track web pages (e.g., landing pages) and forms associated with the web pages. Such entities generate web pages with a graphical user interface editor (e.g., an HTML editor) based on templates that incorporate web page design. Such entities publish or post the web page to the network 16 (e.g., the Internet on intranet) such that the web page is accessible to users that view the web page on client systems. The server 12 hosts the web pages, such that the web pages are customizable by the entities with access to the graphical user interface editor and so that the entities do not have to coordinate time from a web team to publish the page. In addition to web-page generation software/data the server 12 includes a structure 13, e.g., a file, data structure, etc. 13 that includes unique identifier fields 13a, (e.g., account identifier fields or URL's) and modifications 13b to the web pages for the corresponding account identifiers (as discussed below). This structure 13 can also be or alternatively be stored the database 24.

The promotion management software 14 generates marketing campaign web pages associated with a marketing campaign. The web pages include a page tag (e.g., a JavaScript page tag) that specifies an account identifier for the marketing campaign. Through the page tag with the account identifier, the web pages are associated with the marketing campaign, because each web page associated with a particular marketing campaign includes a page tag with the unique account identifier.

Figure 2:
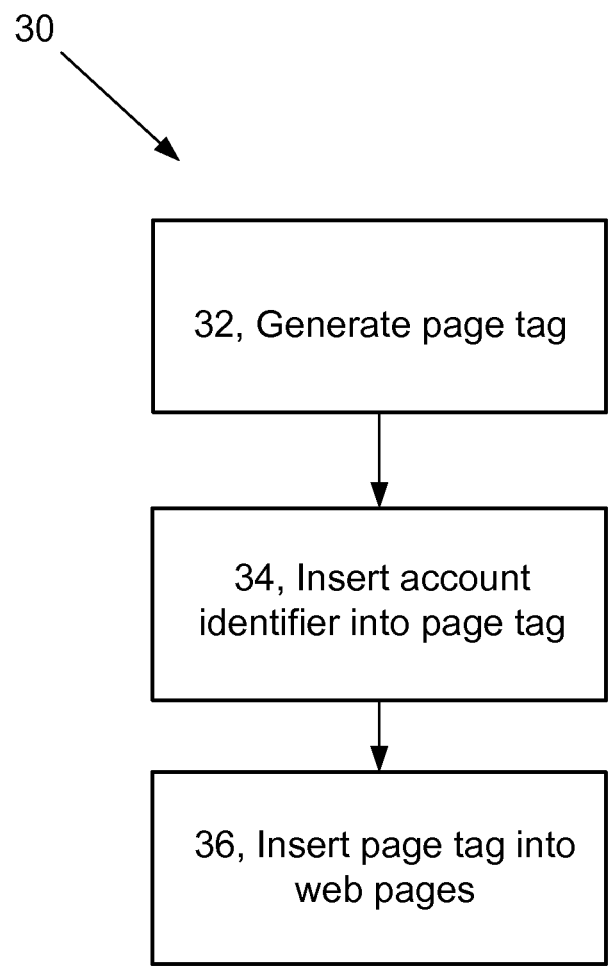
FIGS. 2, 3, 5 and 6 are flow charts of processes used by the promotion management software.

Referring to FIG. 2, the server 12 associates 30 a marketing campaign's web page with an account identifier as follows. The server 12 generates 32 a page tag. The server 12 inserts 34 into the page tag an account identifier that corresponds to the marketing campaign. The server 12 inserts 36 the same page tag into each of the web pages associated with the same marketing campaign. Additionally, the same page tag can be manually interested into the web page by an author or developer of the web page. The page tag is inserted in the web page after a particular tag (e.g., the hypertext mark-up language ("HTML") body tag (i.e., "<body>") in the web page.

Through the page tag, each web page of a collection of web pages associated with particular marketing campaign is updated, as required, and modified in real-time. The page tag includes a script or file (e.g., a JavaScript file) that when executed by the client systems 18a-18i causes the client systems 18a-18i to download from the server 12 modifications and updates to the web pages. Specifically, when a user downloads a web page, software (e.g., a web browser) on the client system 18a-18i executes the page tag, causing the page tag to send a request for web page updates to the decision engine on the server 12. The decision engine maintains a listing of web page updates associated with various marketing campaign account identifiers. The request for web page updates includes a particular account identifier. Based on the particular account identifier included in the request, the decision engine selects web page updates associated with the particular account identifier and sends these web page updates (e.g., instructions, script files or code) to the client systems 18a-18i, as discussed in further detail below with reference to FIG. 3.

As the contents of a web page change or are updated, the page tag need not change or need to be modified, because the page tag does not include the scripting code for the modifications. Rather, as described above, the execution of scripting code in of the page tag causes the server 12 to send the updates to the client systems 18a-18i according to the specified account identifier for the marketing campaign.

The page tag includes variables to control the flow and content of information to and from the server 12. The page tag includes a variable associated with an account identifier (e.g., var accountId=3435453). When the page tag is executed on a client system 18a-18i and a request for updates is sent to the server 12, the request includes the account identifier to identify the marketing campaign for which the client system 18a-18i is requesting web page updates.

The page tag also includes a uniform resource location ("URL") variable to identify the marketing campaign based on a URL (e.g., a vanity URL) that implies the account identifier associated with the marketing campaign. An example of the URL variable includes "var url=http://imod.yourdomain.com." The "http://imod.yourdomain.com" URL is unique to a marketing campaign. Accordingly, when a request from the client system 18a-18i to the server 12 includes the "url" variable, the server 12 identifies the marketing campaign for which updates are requested based on the value of the "url" variable.

The page tag also includes a script source variable that specifies a location or a "source" of a script or a file (e.g., a JavaScript file) (collectively referred to herein as a "file," without limitation, and for the purposes of convenience) to be executed by the client systems 18a-18i. The server 12 hosts the file such that the file is accessible through a URL (e.g., http://nameofmarketingservice.javascriptfile.js) by the client systems 18a-18i. The client systems 18a-18i send a request to the server associated with the URL specified in the source variable. The client systems 18a-18i receive and download from the server (associated with the URL specified in the source variable) the contents of the file. The client systems 18a-18i execute the contents of the downloaded file to generate a request for updated web page content.

Page tags including the "accountId," "url" and "source" variables are provided below:

| First page tag |
|---|
| <script type="text/javascript"><br>   var accountId = 3435453;<br>   var url = "http://imod.yourdomain.com";<br></script> |

| Second page tag |
|---|
| <script src=http://your_name.unicaondemand.com/ods/js/imodTag.js type="text/javascript"> </script> |

The web pages of a marketing campaign include a first page tag and a second page tag. The first page tag sets values for the variables that identify a marketing campaign's account identifier by including values for the "account Id" variable and/or the "url" variable. The second page tag embeds the source (i.e., "src=http://your_name.unicaondemand.com/ods/js/imodTag.js") of the file to be executed by the client systems 18a-18i. When the page tags are inserted into a web page, as described above, the first page tag is inserted before the second page tag so that the variables set in the first page tag are visible to the second page tag. Execution of the file designated by the source variable causes the client systems 18a-18i to send a request for web page updates to the server 12. In order for the server 12 to identify the marketing campaign for which updates are being requested, the request includes the account identifier associated with the marketing campaign for which updates are requested. The request includes the account identifier by including the value of either the "accountId" variable and/or the "url" variable in the request. In response to the request, the server sends a file the contents of which are the updates to the web page in an executable code form.

The page tag also includes other variables to control the flow of information sent to and from to the server 12. A "scriptID" variable (e.g., var scriptID="TheMagicTagID") specifies an identifier (e.g., an HTML identifier) associated with the file that is executed by the client systems 18a-18i. The scriptID variable specifies a unique identification number for the file to distinguish the file from other elements within the web page.

Another variable included within the page tag is a "referrer" variable (e.g., var referrer=http://www.google.com/?q=cheapt+tvs). The referrer variable captures the URL of a web page that passed or "referred" the user to the web page in the marketing campaign. The referrer information (e.g., the captured URL) is sent to the server 12 and stored in the database 24, such that the referrer information can be queried during generation of search results for the marketing campaign.

When the page tag is executed the client system 18a-18i, the page tag instructs software (e.g., a web browser) running on the client system 18a-18i to perform various actions including retrieving a web page, reporting events back to the server 12 and retrieving modifications to the web page.

Figure 3:
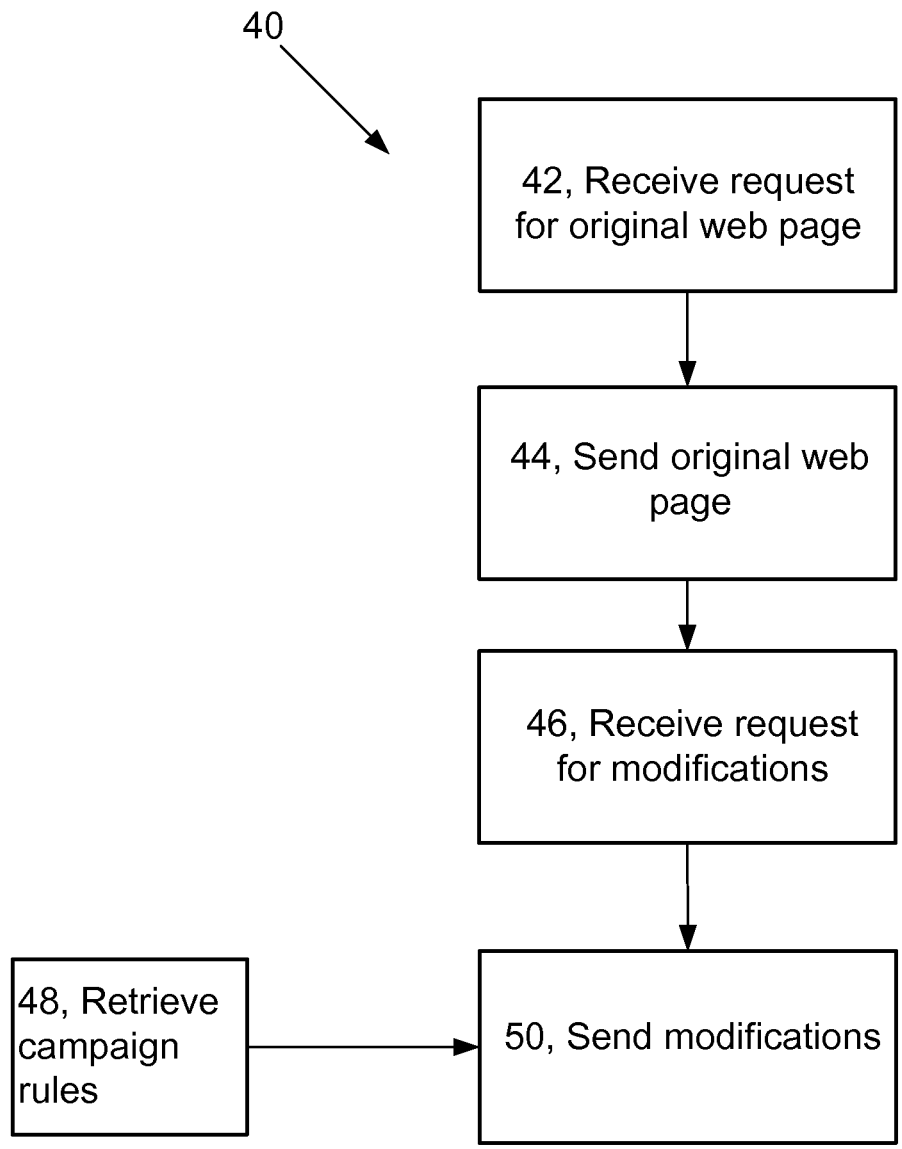

Referring to FIG. 3, the server 12 causes 40 a display device on a client system 18a-18i to display an updated version of a web page as follows. The server 12 receives a request 42 for a web page. The server 12 sends 44 the web page to the client system 18a-18i. The server 12 also receives 46 from the client system 18a-18i a request for modifications to the web page by the client system 18a-18i executing the page tag. As previously described, the request includes an account identifier (e.g., a value for the "url" variable and a value for the "accountId" variable) specifying the marketing campaign for which updates are requested. The server maintains a list, an index, a table or other data structure of the campaign rules (e.g., a listing of the modifications and updates associated with a web page (13, FIG. 1)) associated with the various account identifiers. The server 12 retrieves 48 the campaign rules associated with the account identifier included in the request. The server 12 sends 50 the campaign rules including the modifications to the client system 18a-18i. The client system 18a-18i downloads the campaign rules and software on the client system 18a-18i updates the web page with the modifications included in the downloaded campaign rules, causing the web page to be updated with the modifications included in the campaign rules in real-time.

The campaign rules include instructions (e.g., JavaScript files) specifying how a web page should be updated. The campaign rules are generated by the server 12 based on a user's recorded actions while modifying a visual representation of the web page.

Figure 4:
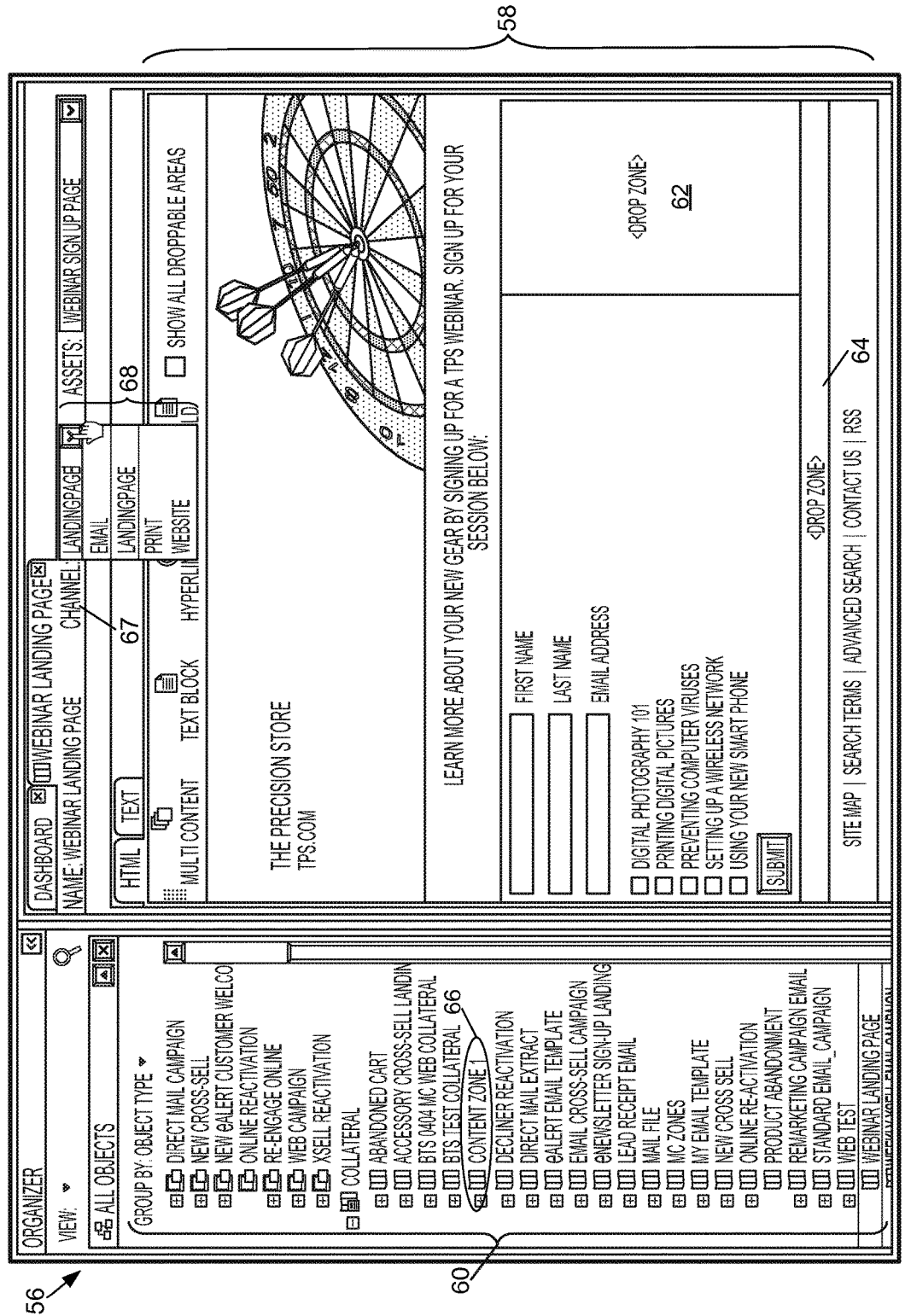
FIGS. 4 and 7 are screen images of graphical user interfaces generated by the promotion management software and rendered on a display screen of a display device.

Referring to FIG. 4, a user of the system 10 modifies a web page through a graphical user interface 56, for example, by employing "drag and drop" functionality. The graphical user interface 56 when rendered on a display device renders a visual representation 58 of the contents of the web page. The graphical user interface 56 includes a field box (not shown) into which a user inputs an account identifier (or other identifying information, including URL information). The account identifier is sent to the server 12 in a message to notify the server of the particular marketing campaign for which web pages are being updated.

Section 60 of the graphical user interface 56 displays a pre-defined list of objects that may be added to the web page. The user selects an object and using the "drag and drop" functionality, moves the selected object into the visual representation 58 of the web page, incorporating the selected object into the web page. The visual representation 58 of the web page includes "drop zones" 62, 64, which are areas of the visual representation 58 of the web page into which a user may add or "drop" various objects. For example, a user selects the "content zone 1" object 66 in section 60 of the graphical user interface 56 and drags the "content zone 1" object 66 into the drop zone 62, adding the contents of the "content zone 1" object 66 to the drop zone 62. Additionally, the channel section 67 of the graphical user interface 56 allows a user to select and update various channels (e.g., email, a landing page and a website) of a marketing campaign. A drop down menu 68 is included in the graphical user interface 56 and displays a list of the various channels that may be updated.

Figure 5:
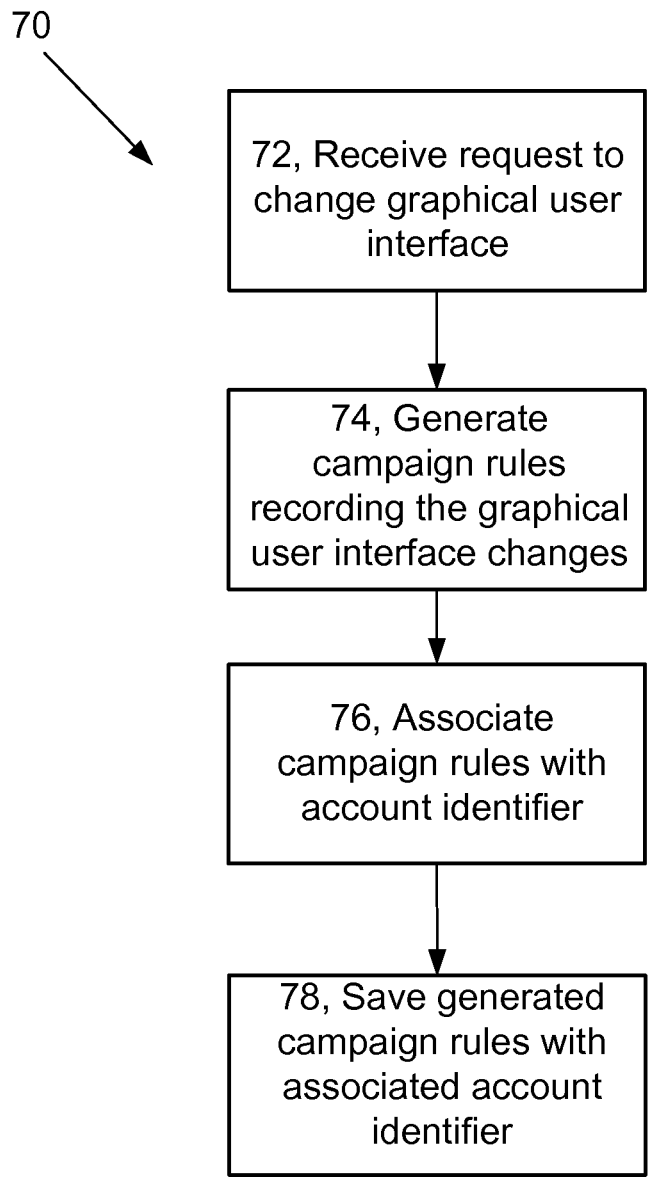

Referring to FIG. 5, the server 12 generates 70 the campaign rules as follows. The decision engine on the server 12 receives 72 a request to modify the visual representation 58 of a web page associated with a particular account identifier. This request is generated by the client system 18a-18i when a user modifies the visual representation 58 of the web page, by selecting an object and including the selected object in the visual representation 58 of the web page.

The decision engine on the server 12 records 74 the location of the selected object on the visual representation 58 of the web page and generates 74 instructions (e.g., JavaScript code or other scripting code files) which specify the location of the selected object added to the visual representation 58 web page. The decision engine also generates 74 instructions specifying how a web page is modified based on other updates made to the visual representation 58 of the web page.

The decision engine associates 76 the campaign rules with the marketing campaign's account identifier (or other identifying information, including a vanity URL) to identify campaign rules for a particular marketing campaign. The server 12 saves 78 the generated instructions with the associated account identifier. As described above, a client system 18a-18i sends a request to the server 12 for campaign rules for a web page. The request includes the account identifier. Based on the account identifier, the decision engine determines whether any campaign rules are associated with the account identifier. For the campaign rules that are associated with the account identifier, the decision engine downloads the campaign rules and sends them to the client system 18*a*-18*i*. The client system 18*a*-18*i* executes the campaign rules to update the web page in real-time.

A user customizing the web page also generates "variable substitution" modifications, in which various objects are displayed in the web page based on the attributes of the viewer of the web page. In one particular example, a user adds a banner object to a web page. When adding the banner object to the web page, the user selects a field (e.g., a button or a drop down box) (not shown) in the graphical user interface 56 specifying that the banner is a variable substitution modification in which various banners are displayed based on the income attributes of a viewer of the web page. The graphical user interface 56 displays fields (not shown) into which the user inputs the viewer criteria to be used in selecting the banner to display to a viewer of the web page. In one particular example, the user specifies that viewers with an income of less than $50,000/year receive banner A, viewers with an income between $50,000/year and $80,000/year receive banner B and viewers with an income greater than $80,000/year receive banner C. When a viewer requests a web page that includes the variable substitution modification banner, the decision engine on the server 12 queries the database 24 to determine the viewer's income attributes based on the viewer's identity (e.g., account number, IP address or identification information included in a cookie). Based on the income attributes returned by the database 24, the decision engine selects the banner to be displayed in the web page presented to the viewer.

Additionally, certain objects in the web page are "locked," or are not allowed to be modified or updated by a user. In one particular example, an administrator of the web page when designing a web page specifies that a "buy now" button is not replaceable and a user modifying the web page cannot delete the "buy now" button or replace the "buy now" button with another button.

Through execution of the page tag, the client systems 18*a*-18*i* send reporting events (e.g., messages) to the server 12. The server 12 collects reporting events that allow a user to monitor the performance of the marketing campaign. The reporting events also provide visitor and customer reporting and analysis, unifying customer metrics for a particular marketing campaign.

Additionally, when a marketing campaign includes multiple channels (e.g., a web page and email), the server 12 collects and collates the reporting events based on the channel with which the reporting event is associated. A user sends the server a query request, the results of which are analyzed by the server 12 to manage and to assess the effectiveness of a marketing channel.

The page tag includes a reporting variable (e.g., var reporting_script="{report tagging script url}") specifying the server 12 or the URL to which reporting events should be sent by the client systems 18*a*-18*i*. When software on a client system 18*a*-18*i* generates a reporting event for a web page, the software includes in the reporting event the account identifier from the web page's page tag. Accordingly, when the server 12 receives the reporting events, the server 12 stores and collates the received reporting events based on the account identifier included the reporting events.

When the reporting variable is included in the page tag and executed by a client system 18*a*-18*i*, the client system 18*a*-18*i* sends the reporting events to the server 12 and/or the server(s) associated with the URL. The reporting events sent to the server(s) include the account identifier for the marketing campaign.

Figure 6:
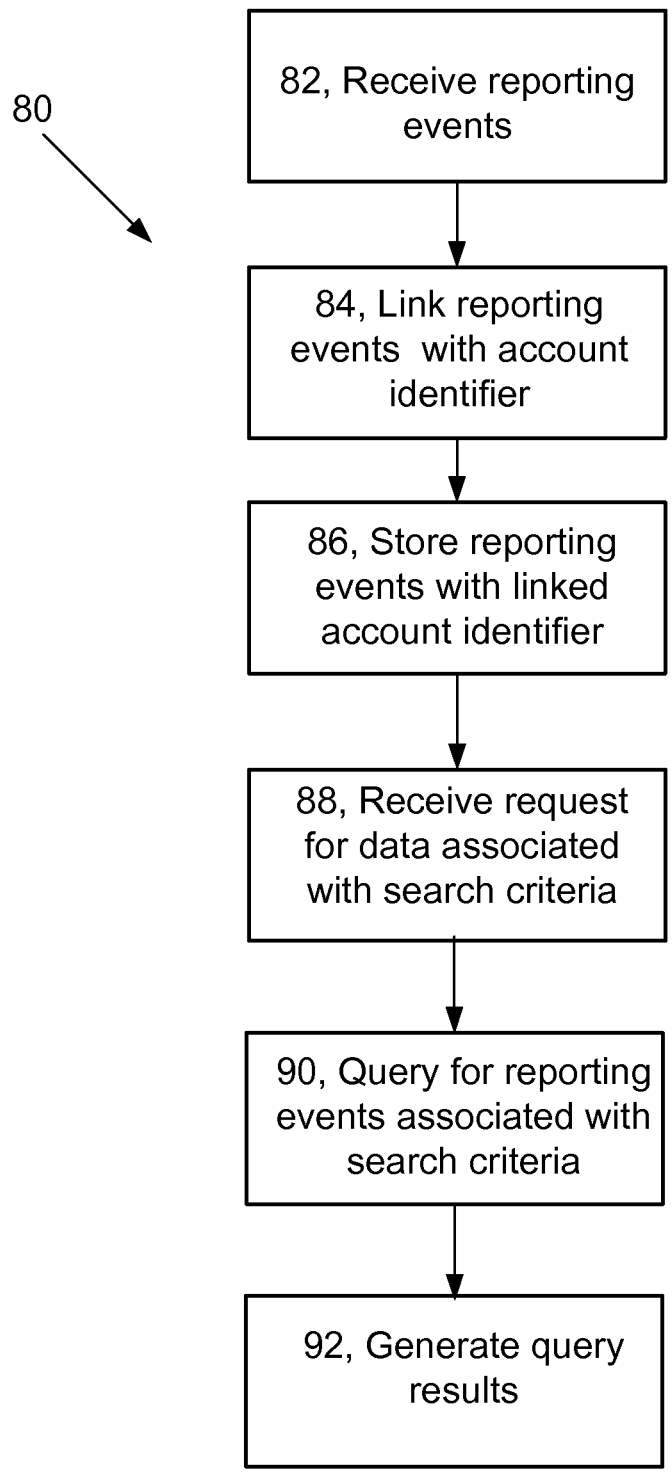

Referring to FIG. 6, the server 12 performs 80 the following data analytics actions. The server 12 receives 82 reporting events. As described above, the reporting events include the account identifier. The server 12 links 84 (e.g., through a pointer) the reporting events with the account identifier. The server 12 stores 86 the reporting events with the linked account identifier in the database 24. The server 12 collects reporting events and other data in the database 24 so that the data may be queried by marketers and other users to provide an understanding of customer usage of a marketing campaign website.

The server 12 also receives 88 a request for data (e.g., web analytics data) associated with certain search criteria. The server 12 queries 90 the database 24 for reporting events, web analytics data and other information associated with the search criteria. Upon receiving results of the database query, the server 12 generates 92 query results (e.g., charts and visual representations of the query results). The query results assist a user of the system 10 in monitoring the performance of a particular marketing campaign, monitoring web site traffic to discover root causes of problems (e.g., load problems) associated with the marketing campaign's web pages.

The database 24 stores historical and other customer information (e.g., demographic information, prior transaction information and the results of past marketing interactions). By retrieving results of a search query for historical customer information associated with an account identifier and reporting events associated with the same account identifier, the server 12 generates search results that provide users with a view of current and past marketing programs and associated resources, costs and results.

Figure 7:
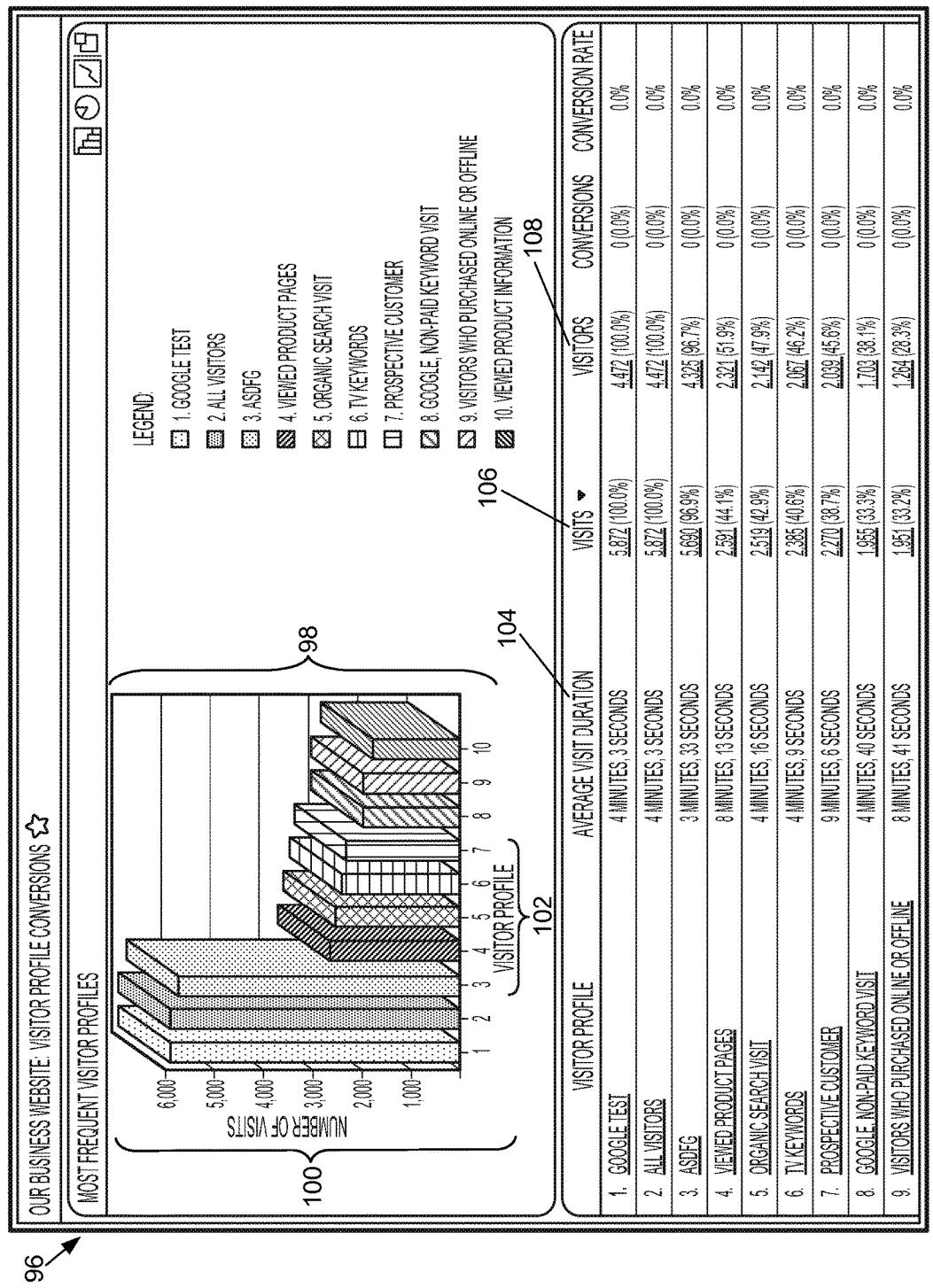

Referring to FIG. 7, a graphical user interface 96 is generated by the server 12 and when rendered on a display device of a client system 18*a*-18*i* renders a graphical visual representation 98 of the number of visits to a web page 100 based on a type of visitor profile 102. In this example, the server 12 collects data regarding the user's profile. The graphical user interface 96 also includes a section 104 that displays "average visit duration" for the various types of profiles, a section 106 that displays numerical information regarding the number of visits for each type of visitor profile, and a section 108 that displays numerical information regarding the number of visitors for each type of visitor profile.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Netscape Navigator, Microsoft Internet Explorer, Mosaic, or Lynx browsers. The computing system can include clients and servers. A client and server are generally remote from each other and typically interact through a communication network. The relationship of client and server arises by virtue of computer programs running on the respective computers and having a client-server relationship to each other.

Web pages are customized based on a value of an identifier that is included in the web pages' page tag. This identifier can be an identifier associated with a user accessing the web page or an identifier associated with the web pages of an entity (e.g., a bank, marketing firm, and educational institution). In one example, a subscriber to a service (e.g., an online newspaper or a periodical service or a banking service) accesses that subscriber's account by logging into a server and receiving a web page associated with the service. Because the subscriber's account is associated with a unique identifier (e.g., an account number), the account identifier variable (e.g., var accountId) included in the page tag of the web page is updated with the value of the subscriber's unique identifier. Accordingly, when the subscriber's computer executes the page tag and causes a request for content modifications to be sent to the server 12, the server 12 retrieves content modifications based on the value of the subscriber's unique identifier. The server 12 sends the subscriber's computer content modifications for the web pages associated with the subscriber's account. Web page modifications can be specific to the subscriber's account, by associating a file recording modifications to the subscriber's web pages with the unique identifier associated with the subscriber's account.

On the other hand, a non-subscriber to such a service accesses a server and receives a web page associated with the service. Because the individual is a non-subscriber and thus in this example does not have an individualized account, such a non-subscriber (as well as other non-subscribers) can be associated with a unique identifier (e.g., corresponding to a general account number), the account identifier variable (e.g., var accountId) included in the page tag of the web page is updated with the value of the general account. When the non-subscriber's computer executes the page tag and causes a request for content modifications to be sent to the server 12, the server 12 retrieves content modifications based on the value of the non-subscriber's unique identifier.

In another example, a page tag included in the web pages of a business entity includes an account identifier specific to the business entity. When the page tag is executed by a computer being used to view the business entity's web pages, a request is sent to the server 12 for modifications to the business entity's web pages. Using the techniques described herein, the server 12 identifies modifications that are specific to the business entity based on the value of the business entity's account identifier included in the page tag.

Other embodiments are within the scope and spirit of the description and the claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. It will be understood that various modifications may be made without departing from the spirit and scope of the application.

What is claimed is:

1. A computer-implemented method, comprising:
    serving, by a computer hardware system, a first web page having a page tag including an identifier;
    serving, by the computer hardware system, a second web page having the page tag including the identifier;

receiving, by the computer hardware system and based upon a client system executing the page tag within a received web page, an update request including the identifier;

searching, by the computer hardware system and based upon the update request, a computer database for updated content using the identifier;

returning, by the computer hardware system and to the client system, the updated content, wherein the received web page is updated by the client system with the updated content;

the updated content includes campaign rules, and the client system executes the campaign rules to update, in real time, the received web page.

2. The method of claim 1, wherein
the identifier is an account identifier.

3. The method of claim 1, wherein
the identifier is a URL variable.

4. The method of claim 1, wherein
the page tag includes a virtual address of a file hosted on the computer hardware system.

5. The method of claim 1, wherein
the page tag includes a referrer variable.

6. A computer hardware system, comprising:
a hardware processor, wherein the hardware processor is configured to initiate the following executable operations:

serving a first web page having a page tag including an identifier; serving a second web page having the page tag including the identifier; receiving, based upon a client system executing the page tag within a received web page, an update request including the identifier;

searching, based upon the update request, a computer database for updated content using the identifier;

returning, to the client system, the updated content, wherein the received web page is updated by the client system with the updated content;

wherein the updated content includes campaign rules, and
the client system executes the campaign rules to update, in real time, the received web page.

7. The system of claim 6, wherein
the identifier is an account identifier.

8. The system of claim 6, wherein
the identifier is a URL variable.

9. The system of claim 6, wherein
the page tag includes a virtual address of a file hosted on the computer hardware system.

10. The system of claim 6, wherein
the page tag includes:
a first page tag including a variable that identifies the identifier, and
a second page tag including a source of a file to be executed by the client system.

11. The system of claim 10, wherein
the page tag includes a referrer variable.

12. A computer program product, comprising: a hardware storage device having computer instructions residing therein, the computer instructions, which when executed by a computer hardware system, cause the computer hardware system to perform:

serving, by the computer hardware system, a first web page having a page tag including an identifier;

serving, by the computer hardware system, a second web page having the page tag including the identifier;

receiving, by the computer hardware system and based upon a client system executing the page tag within a received web page, an update request including the identifier;

searching, by the computer hardware system and based upon the update request, a computer database for updated content using the identifier;

returning, by the computer hardware system and to the client system, the updated content, wherein the received web page is updated by the client system with the updated content;

wherein the updated content includes campaign rules, and
the client system executes the campaign rules to update, in real time, the received web page.

13. The computer program product of claim 12, wherein
the identifier is an account identifier.

14. The computer program product of claim 12, wherein
the identifier is a URL variable.

15. The computer program product of claim 12, wherein
the page tag includes a virtual address of a file hosted on the computer hardware system.

16. The computer program product of claim 12, wherein
the page tag includes:
a first page tag including a variable that identifies the identifier, and
a second page tag including a source of a file to be executed by the client system.

17. The computer program product of claim 16, wherein
the page tag includes a referrer variable.

\* \* \* \* \*